(12) United States Patent
Bonner et al.

(10) Patent No.: US 7,181,461 B2
(45) Date of Patent: Feb. 20, 2007

(54) SYSTEM AND METHOD FOR REAL TIME STATISTICS COLLECTION FOR USE IN THE AUTOMATIC MANAGEMENT OF A DATABASE SYSTEM

(75) Inventors: Charles Roy Bonner, San Jose, CA (US); Namik Hrle, Boeblingen (DE); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/223,953

(22) Filed: Aug. 19, 2002

(65) Prior Publication Data

US 2004/0034643 A1      Feb. 19, 2004

(51) Int. Cl.
*G06F 17/30* (2006.01)
*G06F 15/16* (2006.01)
*G06F 17/00* (2006.01)

(52) U.S. Cl. ............... 707/102; 707/103; 707/202; 709/232; 709/247

(58) Field of Classification Search ............. 707/2, 707/4, 100, 200, 202; 717/127
See application file for complete search history.

(56) References Cited

U.S. PATENT DOCUMENTS 5,581,758 A    12/1996  Burnett et al. ............. 395/614
6,003,022 A *  12/1999  Eberhard et al. ............ 707/2
6,389,430 B1 * 5/2002  Parker ..................... 707/202
2001/0016844 A1 8/2001  Isip, Jr. ..................... 707/7

FOREIGN PATENT DOCUMENTS

WO     WO 01/04798 A1    1/2001

* cited by examiner

*Primary Examiner*—Jeffrey Gaffin
*Assistant Examiner*—Hassan Mahmoudi
(74) *Attorney, Agent, or Firm*—Samuel A. Kassatly (57) ABSTRACT

A computer program product provides accurate statistics in real time. These statistics can be used to determine if a table space in a database management system (DBMS) requires maintenance operations such as reorganization, back up, fresh access path statistics, and/or larger disk space allocation. The DBMS maintains a set of values that provide indications of whether that operation is due on that object. The indicators are asynchronously externalized in dedicated database tables either periodically in user-specified intervals or at some predefined event such as stopping the database. When the user performs a database administration operation, the database management system resets the associated indicators, and reports objects that are in an exception state based on the indicators collected as described for each operation.

25 Claims, 8 Drawing Sheets

SYSTEM AND METHOD FOR REAL TIME STATISTICS COLLECTION FOR USE IN THE AUTOMATIC MANAGEMENT OF A DATABASE SYSTEM

FIELD OF THE INVENTION

This invention generally relates to database management systems, and particularly to a method for providing statistics for enabling database maintenance operations to be performed when needed. More specifically, the database management method monitors inserts, updates, and deletes to database objects, such as "catalog" or "user" objects in a database management system, and updates memory blocks corresponding to the counts of inserts, updates, and deletes. The database management method then uses the counts of inserts, updates, and deletes to specify which objects require maintenance and which maintenance operations to perform.

BACKGROUND OF THE INVENTION

Large enterprise application solutions use database management systems (DBMS) such as DB2®, Informix®, Oracle®, and MS SQL Server to store and retrieve data. The schemas for these solutions are very complex, including tens of thousands of tables and indexes. The number of objects in the database poses significant challenges to typical database administration (DBA) operations such as backup, reorganization, statistics collection, and database space growth management.

In practice, database administration operations typically follow one of two approaches: performing the operations on all the objects, or performing the operations on only those objects for which a particular database administration operation is necessary. Although safe (i.e., not missing maintenance on any object) and simple to specify, the first approach is impractical for large databases, and many database users employ the second approach which is an exception-based approach. This exception-based approach requires the user to determine which objects require a particular database administration operation. Typical exceptions requiring database administration operation include:
1. backup too old or non-existing;
2. disorganized data;
3. obsolete statistics used by the optimizer; and
4. little or no space available for object.

To detect objects that are in an exception state, the customer must analyze the database using their own database administration tools, products provided by the DBMS, or utilities available from third-party vendors. These tools collect and report the indicators that help identify objects in the exception state; the exception states fall into three categories: reorganization, backup, and statistics.

Large databases consist of many parallel tasks, allowing parallel processing for many of the database's functions. Since these tasks operate in parallel, they can insert data in the same table or index space, causing poor clustering which requires a reorganization to correct.

In addition, when record updates do not fit in the same page as the original record, the database creates an overflow record and a pointer from the original record to the overflow record. This overflow is space inefficient and time consuming when attempting queries on the data in the database, requiring correction by the reorganization utility. Reorganization is required to optimize the placement of data and arrange data in a clustering sequence and to remove overflow records. The reorganization utility may need to change primary and secondary quantities to remove the secondary extents. Reorganization deletes and defines a new data set, which allows new values to take affect. Prior to reorganization, the primary and secondary quantity values can be altered. The new values take affect during reorganization.

The backup utility creates periodic image copies of the data to maintain security, safety, and integrity of the data. The statistics utility assists the database in efficiently responding to queries. Since multiple indexes can refer to the same table space, the database must choose which path to take to access the data of interest when responding to a query. Accurate and current statistics are required to guide the optimizer in choosing the most efficient paths.

While the exceptions based approach to database administration reduces processing time and complexity, several difficulties remain. To provide exception state indicators, the utilities must examine every object because there is no external indication which objects or table spaces require maintenance. Examining all the objects is costly and time consuming. With no external indication specifying that an object or table space requires maintenance, database administration is often performed needlessly on objects that don't require maintenance, increasing the batch window and data unavailability. Therefore, the utilities are scheduled to run either on demand (after major database maintenance) or periodically such as once a week. Consequently, objects can be in an exception state for a long time before detection.

In addition, the maintenance of objects that are not in an exception state wastes valuable batch window time. Database tools are needed that will automatically flag objects needing maintenance, reducing the amount of processing time required to perform maintenance on the database.

Large databases typically used by large corporations require administration by skilled database administration personnel to manage and maintain the database. However, skilled database administration personnel are becoming increasingly rare and require extensive training. Database tools are needed to automatically recommend maintenance requirement and replace some of the functions currently performed by database administration personnel, reducing the skill level and number of personnel required to maintain the database.

Thus, there is need for a system that will recommend when maintenance is required by an object or table space and that identifies the maintenance utility operations to be performed on that object. The need for such a system has heretofore remained unsatisfied.

SUMMARY OF THE INVENTION

The system and method for real time statistics collection for self-managing a database system satisfy this need. The database management method and system of the present invention provide accurate statistics in real time that can be used to determine if a table space requires reorganization, back up, fresh access path statistics, and/or larger disk space allocation.

For each pair (database object, database administration operation), the database management system or DBMS maintains a set of values that can be indicative of whether that operation is due on that object. The indicators are specific to the associated operation.

Indicators associated with the backup operation include:
the number of pages changed since the last backup;
the number of rows modified (inserted, deleted, or updated) since the last backup;

the total number of rows, to enable calculating relative number of rows that changed since the last backup;

the time and log address of the first update after the last backup; and the time of the last backup.

The reorganization operation uses the following indicators:

the number of overflow rows since the last reorganization;

the number of unclustered inserts since the last reorganization;

the total number of rows, to enable calculating relative number of overflow or unclustered rows;

the number of rows inserted, deleted or updated;

the number of disorganized large objects;

the number of inserts at the end of index;

the number of index page splits since the last reorganization;

the number of index level changes since the last reorganization;

the number of mass deletes and drops since the last reorganization;

the time of the last reorganization; and the number of inserts, updates and deletes (e.g., statistics), since the last reorganization.

The indicators used by the statistics collection operation are:

the number of rows inserted since the last statistics collection;

the number of rows updated since the last statistics collection;

the number of rows deleted since the last statistics collection;

the total number of rows, to enable calculating relative number of rows that changed since the last statistics collection; and the time of the last statistics collection.

The space management operation relies on the following indicators:

the amount of allocated space;

the amount of used space;

the number of extents; and the number of rows.

The objects for which the indicators are maintained depend on the specific DBMS; typically these objects are tables, indexes, and table spaces. This list of operations and indicators is presented for illustrative purposes only and is not exhaustive; different DBMS' have specific operations and indicators for identifying exception states.

The database management system of the present invention maintains the indicators in memory. Some of the indicators are accumulative (e.g., the number of records, rows, index entries, pages changed since the last backup) and some are given in absolute values (e.g., the amount of allocated space). The indicators are asynchronously externalized in dedicated database tables either periodically in user specified intervals or at some predefined event such as stopping the database. The asynchronous externalization of the indicators ensures a minimal impact to other database functions.

When the user performs a database administration operation, the data management system resets the associated indicators. For example, when the user performs an object backup, the system sets to zero the numbers of data blocks (or objects) changed and rows modified, sets to a null the time and log address of the first update, and sets the time of the last backup to the actual time the backup was run.

The database management system reports objects that are in an exception status based on the indicators collected as described for each operation. Reporting can be implemented in either real time or near-real time. In both cases, the objects found in exception status can be automatically corrected by the appropriate database administration operation.

For reporting, the database management system evaluates a check constraint defined for each indicator. This evaluation is compared to user-defined thresholds. When the threshold is reached, the user is alerted to the exception state for the associated object and the database administration operation required to correct the exception state. Once issued, the alert is not repeated. The database management system removes the alert when the prescribed operations have been performed.

Externalizing real-time statistics can be delayed for a time period of 1–1440 minutes, with 30 minutes being a preferred period. The database management system externalizes the data periodically, typically every half hour or so. As a result, the indicators are not current, but adequate for assessing an object and providing the timely detection of an exception state. The reporting phase is less resource intensive for near-real time reporting than for real-time reporting. Near-real time reporting can typically be implemented outside of the DBMS as periodically executed SQL queries against the externalization tables.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Daemon: A program that runs continuously in the background until it is activated by a particular event.

Externalize: To take statistics stored in memory and aggregate those statistics to the appropriate values in the real-time statistics table.

Internet: A collection of interconnected public and private computer networks that are linked together with routers by a set of standards protocols to form a global, distributed network.

Partition: Partition represents the physical data set(s) that make up the logical table space; partitions can be, for example 1 to 255.

SQL: Structured Query Language, a standardized query language for requesting information from a database.

Table: Data arranged in rows and columns. A spreadsheet, for example, is a table. In relational database management systems, all information is stored in the form of tables.

Table Space: A container for tables. A table space can be associated with one or more physical data sets.

Figure 1:
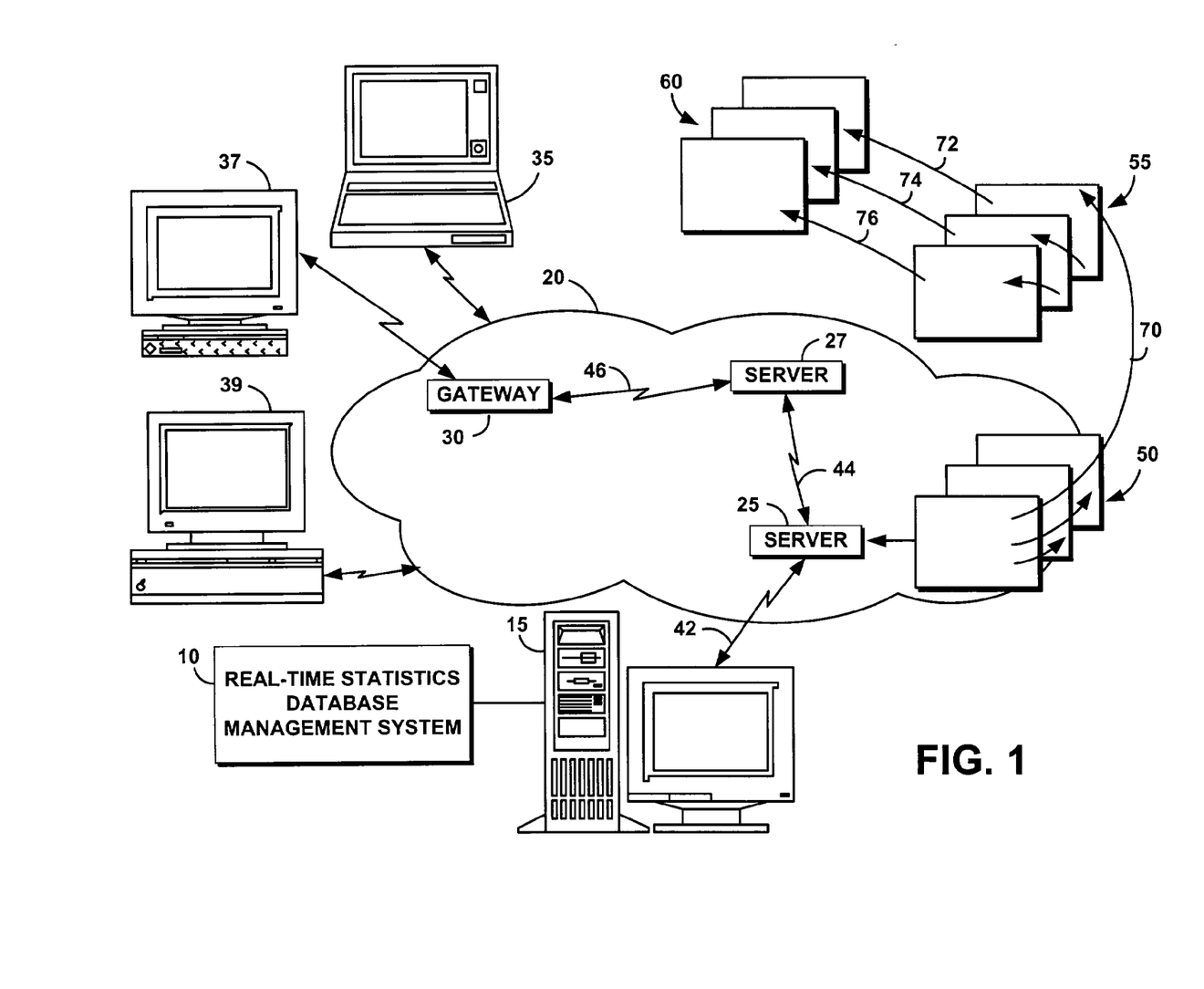
FIG. 1 is a schematic illustration of an exemplary operating environment in which a database management system and method of the present invention can be used.

FIG. 1 portrays the overall environment in which a database management system 10 and method 400 (FIG. 6) for real time statistics (RTS) collection for self-managing a database system according to the present invention may be used. The system 10 includes a software programming code or computer program product that may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. The techniques and methods for embodying software programming code in memory, on physical media, and/or distributing software code via networks are well known and will not be further discussed herein.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users, are represented by a variety of computers such as computers 35, 37, 39, and can query the host server 15 for desired information through the communication network 20.

The host server 15 is connected to the network 20 via a communications link 42 such as a telephone, cable, or satellite link. The servers 25, 27 can be connected via high-speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
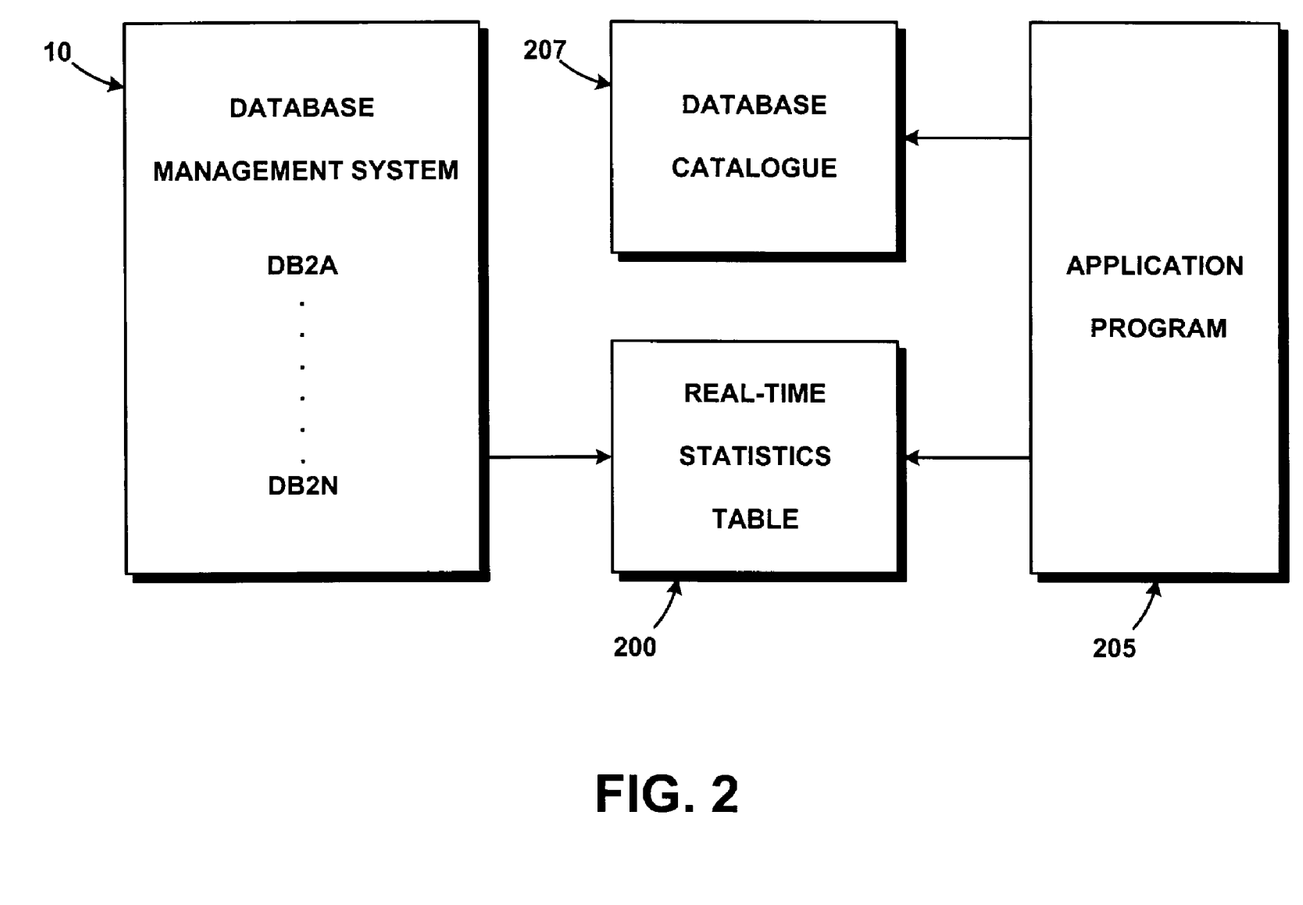
FIG. 2 is a block diagram of the high-level architecture of the database management system of FIG. 1.

The high-level architecture of the data management system 10 is shown in FIG. 2. The system 10 includes a multiple of tasks that are labeled DB2A to DB2N. The system 10 collects statistics in real time, storing them in the real-time statistics tables 200. One or more application programs 205 query the statistics and help the user decide when to run database administration maintenance utilities such as REORG (reorganization), RUNSTATS (update statistics), or COPY (back up).

A database catalogue 207 is used to determine if an object is orphaned, that is if it has been dropped; and to translate the ID to the object name.

Figure 3:
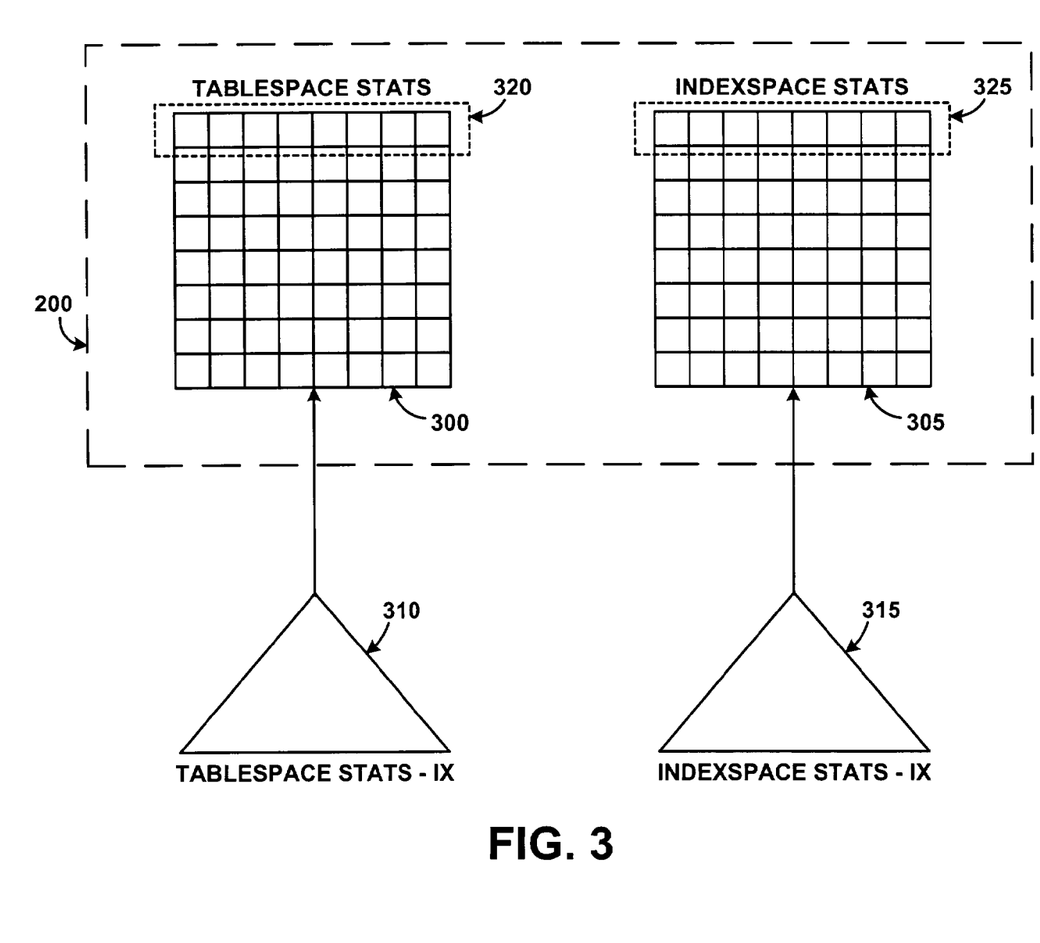
FIG. 3 displays the high-level architecture of real-time statistics tables used by the database management system of FIGS. 1 and 2.

The structure of the real-time statistics table space 200 is illustrated in more detail in FIG. 3. In the example illustrated in FIG. 2, the table space 200 is comprised of a TABLESPACESTATS table 300 and an INDEXSPACESTATS table 305.

Each entry in the TABLESPACESTATS table 300 represents statistics for table space entry in the database table space. Each entry in the INDEXSPACESTATS table 305 represents an entry in the database index. TABLESPACES-TATS_IX 310 is a unique index on TABLESPACESTATS 300, and INDEXSPACESTATS_IX 315 is a unique index on INDEXSPACESTATS 305.

Figure 7:
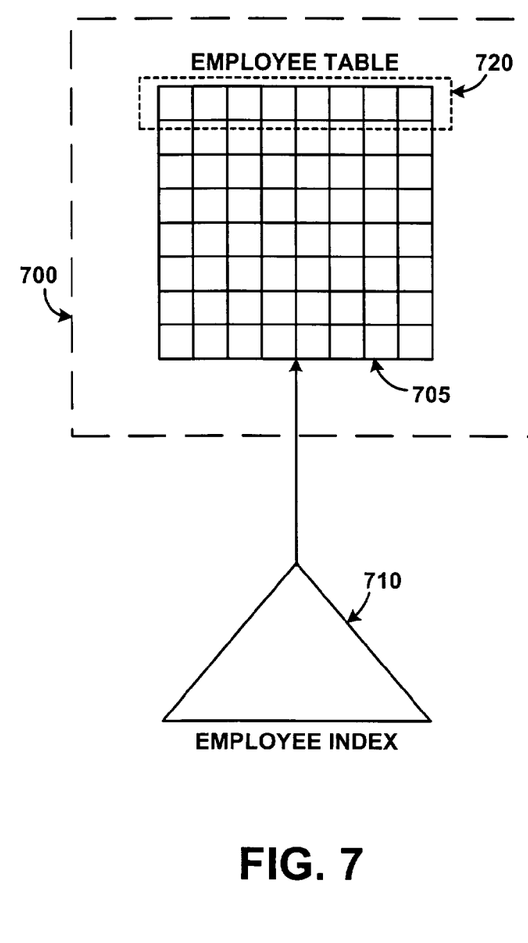
FIG. 7 is an example of a table space.

For example, the user may have an employee database that includes an employee table space 700 and index 710 as shown in FIG. 7. With reference to FIG. 7, the table space 700 can be "partitioned" into physical data sets P1, P2, P3 that make up the logical table. A partition represents the physical data set(s) that make up the logical table space; partitions can be, for example, 1 to 255. Each statistics entry 320 in TABLESPACESTATS table 300 can represent either a partition (P1, P2, P3) or the entire user table space. An index can be similarly partitioned and represented in INDEXSPACESTATS table 305.

A feature of the database management system 10 is that the scope of the three maintenance functions (reorganization, update statistics, and copy) is at partition granularity. One to one correspondence is created by system 10 between each row such as row 320 in the TABLESPACESTATS table 300 and the partition. Similarly, one to one correspondence is also created between each row, such as row 325 in the INDEXSPACESTATS table 305 and the index partition. Since system 10 performs maintenance functions at partition granularity, it also makes recommendations at the partition level. For example, during the week the user updates partition 2 (P2). System 10 would then recommend maintenance for P2, but not P1 or P3.

As the user inserts and deletes rows in the DBMS tables and index entries in the DBMS indexes, system 10 monitors those inserts and deletes according to the present invention. The RTS table 300 is comprised of numerous rows 320, with one row corresponding to each table space or partition in the user DBMS. System 10 updates the statistics in the table each time the user updates, deletes, or inserts a row in the DBMS tables or indexes. One RTS row is created by system 10 for each updated object or partition, where the partition represents a table space or an index.

Since RTS objects are not known or defined previously, they are dynamic objects. The RTS object includes an object name, object attributes, statistics, and modifiers. The object name uniquely identifies the object or partition by using, for example, a three-part name. One identifier in the name is the partition. Object attributes include table space, index, shadow, etc. Statistics include inserts, updates, deletes, space information, and number of index levels. Modifiers include information on the type of inserts, updates, or deletes.

A timeline 400 representative of exemplary events in a DBMS is shown in FIG. 4. At time $t_0$ 405, the user runs the reorganization database administration program, reorganizing all the objects. System 10 resets all reorganization statistics to zero.

At time $t_1$ 410, the user inserts a record, $I_1$, in the table 705 (FIG. 7). System 10 increments the in-memory block 425 of FIG. 5 that corresponds to the inserted table space 700 of FIG. 7. The user then updates a row 720 in the user database at time $t_2$ 415. System 10 responds by incrementing the update count by one for the update statistic in the in-memory block 425 that represents the object or partition that has been updated. If the update at $t_2$ 415 does not cause an update to the index, then system 10 does not update block 430 corresponding to the index. At $t_3$ 420, the user deletes a row, $D_1$. System 10 then increments the delete counter for both the in-memory block 425 and index in-memory block 430 of FIG. 5.

Figure 5:
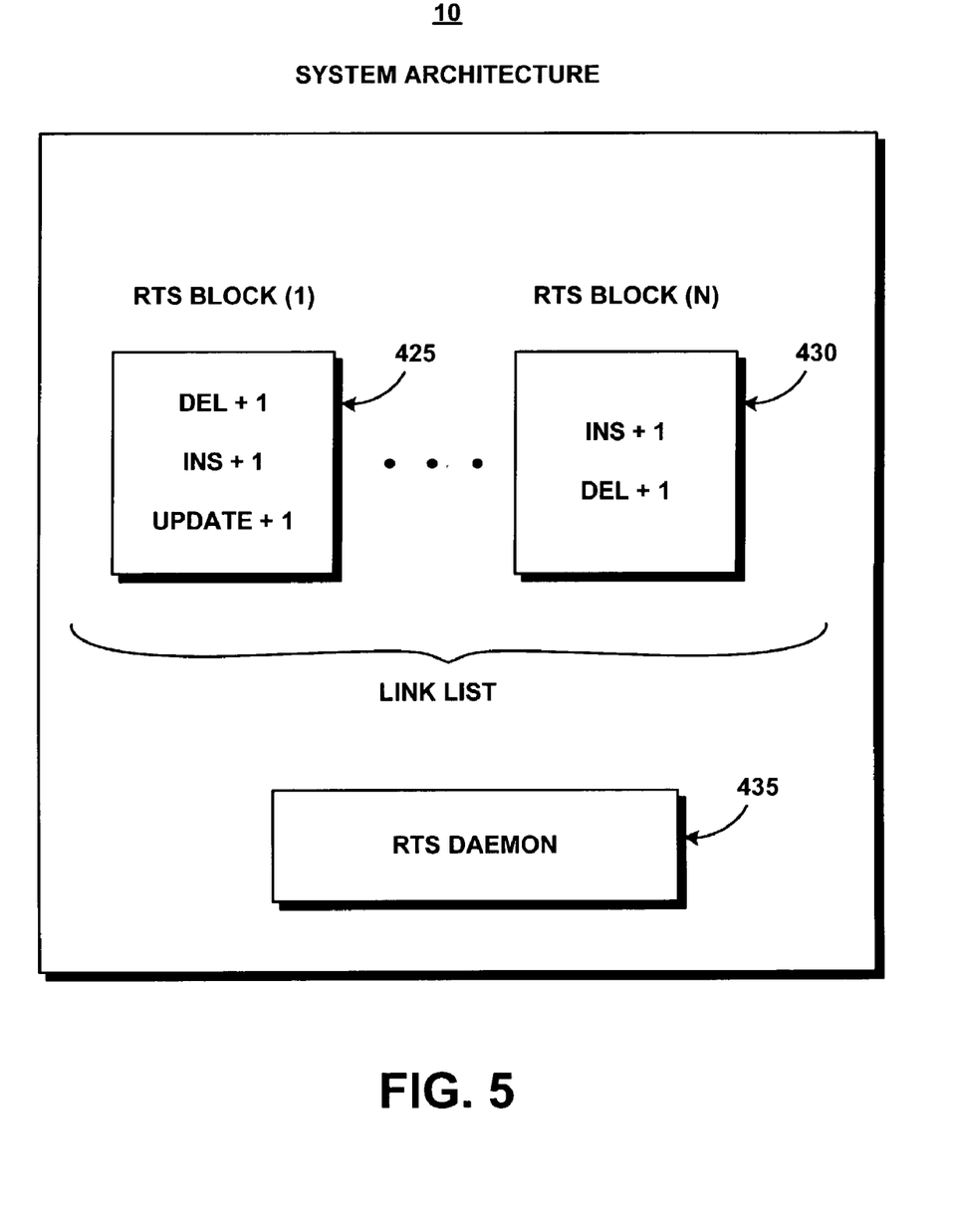
FIG. 5 is a block diagram of the internal structure of the in-memory blocks illustrating a database management method of the present invention for collecting statistics on inserts and deletes.

With reference to FIG. 5, system 10 also includes a RTS daemon 435. The purpose of the RTS daemon 435 is to periodically inspect the RTS blocks 425, 430, and to update the RTS tables in the table space. An important feature of system 10 is the fact that the RTS daemon 435 monitors the aggregate value of each block statistic. This allows system 10 to track all changes to the user database.

For example, a user database contains 1000 rows. Since the last database administration maintenance, the user adds one row and deletes one row. The user database still contains 1000 rows although the user has made changes to the database content. Since system 10 monitors the incremental changes for both inserts and deletes, the RTS daemon 435 indicates to the user a need to perform maintenance even though the overall number of rows did not change.

The RTS daemon 435 repeats the following two steps for every object in the database:

inspect the RTS blocks for exception status; and aggregate the statistics resulting from the inspection to the RTS tables 200.

Another feature of system 10 is the reference of all events in the RTS objects to the time that the last maintenance was performed or since the last activity was performed such as the last reorganization. All of the incremental changes tracked by system 10 are with respect to one of the three maintenance functions: reorganization, backup, or statistics. The reorganization values tracked by system 10 are:

REORGLASTTIME—the timestamp of the last REORG on the table space or partition;

REORGINSERTS—the number of records or large objects that have been inserted since the last REORG or LOAD REPLACE on the table space or partition;

REORGDELETES—the number of records or large objects that have been deleted since the last REORG or LOAD REPLACE on the table space or partition;

REORGUPDATES—the number of rows that have been updated since the last REORG or LOAD REPLACE on the table space or partition;

REORGDISORGLOB—the number of large objects that were inserted since the last REORG or LOAD REPLACE that are not perfectly chunked;

REORGUNCLUSTINS—the number of records that were inserted since the last REORG or LOAD REPLACE that are not well-clustered with respect to the clustering index (a record is well-clustered if the record is inserted into a page that is within 16 pages of the ideal candidate page);

REORGMASSDELETE—the number of mass deletes from a segmented or large object table space, or the number of dropped tables from a segmented table space, since the last REORG or LOAD REPLACE on the table space or partition;

REORGNEARINDREF—the number of overflow records that were created since the last REORG or LOAD REPLACE and were relocated near the pointer record; and REORGFARINDEF—the number of overflow records that were created since the last REORG or LOAD REPLACE and were relocated far from the pointer record.

System 10 also checks through the overflow indicators whether the SQL Update created overflow records and whether those overflows are near or far from the original record. For nonsegmented table spaces (such as the exemplary table space 700 of FIG. 7), a page is near the present page if the two page numbers differ by 16 or less. For segmented table spaces, a page is near the present page if the two page numbers differ by segment size 2 or less.

The statistics tracked by system 10 include, but are not limited to the following:

STATSLASTTIME—the timestamp of the last RUNSTATS on the table space or partition;

STATSINSERTS—the number of records or large objects that have been inserted since the last RUNSTATS on the table space or partition;

STATSDELETES—the number of records or large objects that have been deleted since the last RUNSTATS on the table space or partition;

STATSUPDATES—the number of rows that have been updated since the last RUNSTATS on the table space or partition; and STATSMASSDELETE—the number of mass deletes from a segmented or large object table space or the number of dropped tables from a segmented table space since the last RUNSTATS.

The STATSUPDATES value can be used the STATSDELETES and STATSINSERTS to determine if RUNSTATS is necessary. For example, suppose that a user's site maintenance policies require that the user perform RUNSTATS after 20 percent of the rows in a table have changed. To determine if RUNSTATS is required, the user determines from statistics provided by system 10 the sum of updated, inserted, and deleted rows since the last RUNSTATS. The user then calculates the total number of rows changed since the last RUNSTATS. If the percentage is greater than 20, then the user performs RUNSTATS.

The copy values tracked by system 10 are:

COPYLASTTIME—the timestamp of the last full or incremental image copy on the table space or partition;

COPYUPDATEDPAGES—the number of distinct pages that have been updated since the last COPY;

COPYCHANGES—the number of insert, delete, and update operations since the last COPY;

COPYUPDATERSN—the log record sequence number or relative byte address (RBA) of the first update after the last COPY; and COPYUPDATETIME—the timestamp of the first update after the last COPY.

The user can compare COPYUPDATEDPAGES to the total number of pages in the database to determine when a copy or backup is needed. For example, the user might wish to take an incremental copy when one percent of the pages have changed. The user might also want to make a full image copy when 20 percent of the pages have changed.

Figure 4A:
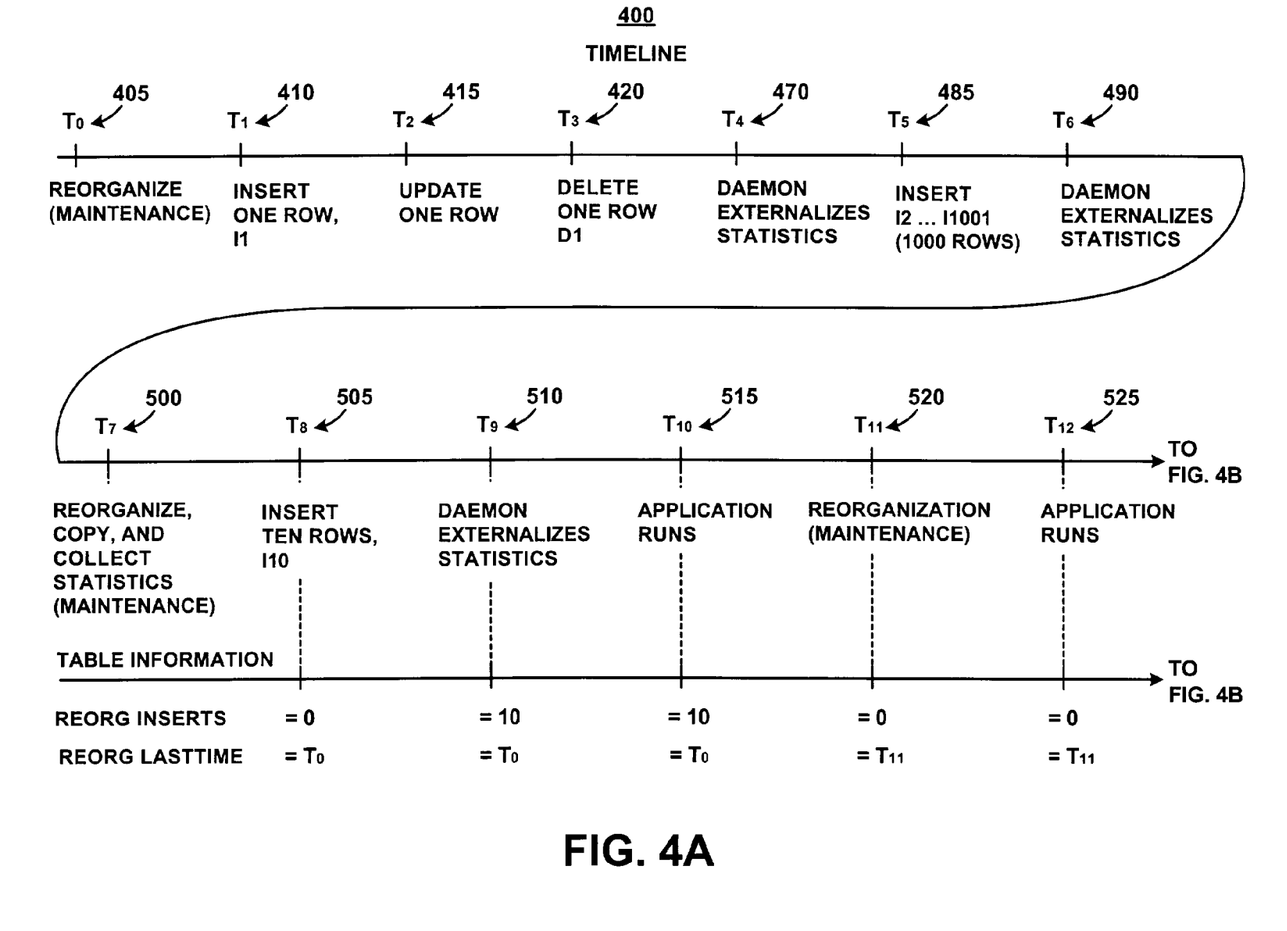
FIG. 4 is comprised of FIGS. 4A and 4B, and displays a timeline representative of events in a DBMS that illustrates the performance of the database management system of FIGS. 1 and 2.
Figure 4B:
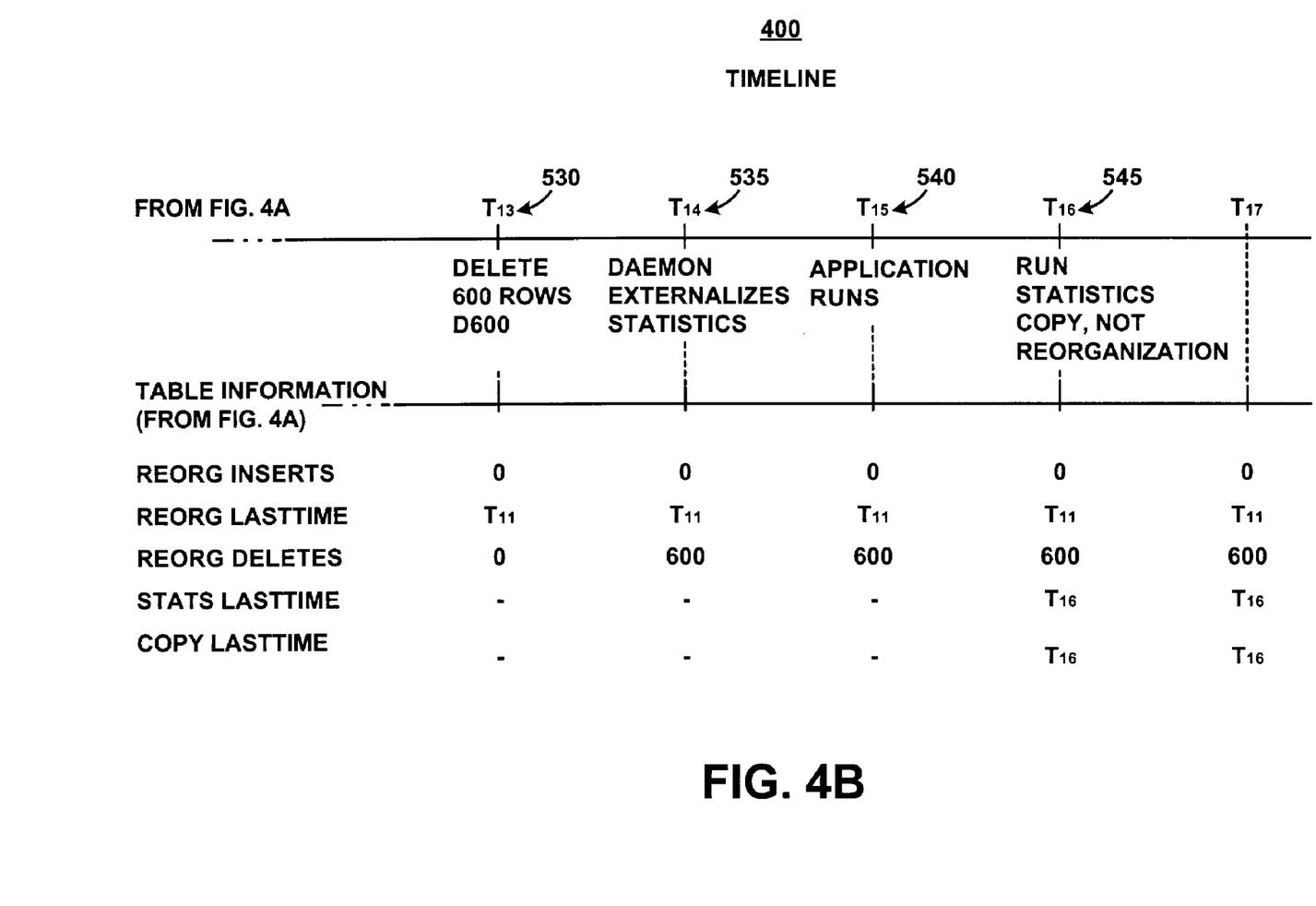
Figure 6:
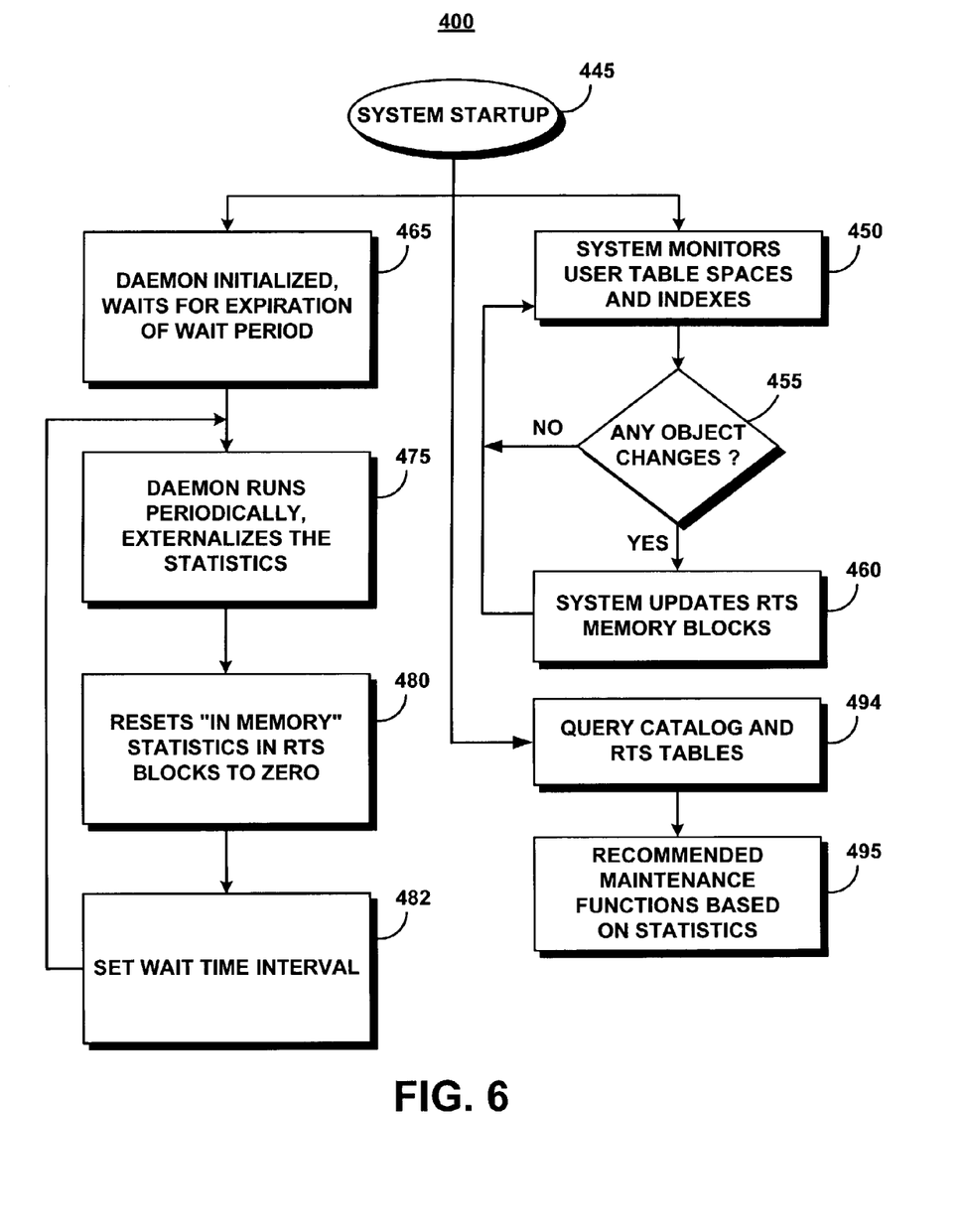
FIG. 6 is a flow chart that illustrates the logic of the database management system of FIGS. 1 and 2.

In operation, and with further reference to method 400 of FIG. 6 and the timeline 400 of FIGS. 4A and 4B, the DBMS starts in step 445. While the DBMS is running, system 10 monitors the user tables and indexes in step 450, and checks for object changes such as inserts, deletes, or updates in step 455. If changes are detected in step 455, system 10 then updates the RTS memory blocks 425 in step 460. The application program 205 queries the RTS tables in step 494, and makes maintenance recommendations in step 495. The application program 205 could be part of system 10 or user supplied.

Meanwhile, system 10 initializes the RTS daemon 435 in step 465 and waits for the expiration of the wait period, STATSINTERVAL, set by the user at a specified time, such as 30 minutes. Steps 450, 455, and 460 operate concurrently with step 465.

At $t_4$ 470 of FIG. 4A, the wait period expires and the RTS daemon 435 in step 475 externalizes the statistics collected in step 460 by inspecting RTS blocks and aggregating the RTS table spaces 200. The RTS daemon 435 processes every user object (in-memory blocks 425, 430) in the DBMS, then resets all "in-memory" statistics to zero in step 480. System 10 then sets the wait time for the RTS daemon 435 in step 482, and the RTS daemon 435 waits for the wait period to expire.

At $t_5$ 485 of FIG. 4A, the user inserts rows $I_2$ to $I_{1001}$, a total of 1000 rows in all. At $t_6$ 490, system 10 detects in step 475 that changes were made and updates the total number of rows in the RTS tables 300, 305 of FIG. 3. If the number of rows was previously 500, the total number of rows is now 1500, with no deleted rows and no updated rows since the last externalization (at time t4).

The application program 205 can now look at the accumulated statistics and determine based on user specified criteria whether a maintenance operation should be recommended. Based on the examination of the statistics, in step 495 the application program 205 at $t_7$ 500 recommends and/or performs one or more of the following: reorganization, update statistics, or copy.

At $t_8$ 505, the user inserts 10 rows. The RTS daemon 435 has not yet externalized the statistics collected in step 460, so the number of inserts, REORGINSERTS, is still zero. At $t_9$ 510, the RTS daemon 435 externalizes the data, and now REORGINSERTS=10.

At $t_{10}$ 515, the application program 205 inspects the statistics and generates maintenance recommendations. The user then performs database administration maintenance as necessary. In the example portrayed in timeline 400, the application program 205 recommends a reorganization. The user performs the reorganization at time $t_{11}$ 520 and system 10 resets REORGLASTTIME to t11. In the case that a copy or statistics database administration maintenance was performed, system 10 would reset the copy time, COPYLASTTIME, or statistics time, STATSLASTTIME, to actual time and also reinitializes the REORG (or copy or statistics classes) to zero.

At time $t_{12}$ 525, the application program 205 inspects the statistics and observes that no event changes have occurred since the last reorganization. Consequently, the application program 205 does not issue a recommendation for maintenance.

The user next deletes 600 rows from the DBMS at time $t_{13}$ 530. The RTS daemon 435 externalizes delete=600 in step $t_{14}$ 535, so that since $t_{11}$ 520 the reorganization values are:
REORGINSERTS=0
REORGUPDATES=0
REORGDELETES=600.

Since time $t_7$ 500, statistics collected are:
STATSINSERTS=10
STATSUPDATES=0
STATSDELETES=600

Since time $t_7$ 500, copy values are
COPYCHANGES=610 (which is the sum of inserts, deletes, and updates).

At $t_{15}$ 540, the application program 205 compares the statistics collected with user specified parameters. Assuming the user has set the deleted row threshold at 1000 for reorganization, REORGDELETES=600 will not trigger a recommendation for reorganization. However, STATSINSERTS=10, and STATSDELETES=600, AND COPYCHANGES=610 is sufficient in this case to trigger a recommendation for statistics collection and copy or backup.

At $t_{16}$ 545, the user performs the database administration maintenance statistics collection and copy. System 10 now resets to the current time t16 the time for copy, COPYLASTTIME, and statistics, STATSLASTTIME, but not the time for reorganization, REORGLASTTIME. Reorganization is still referenced to $t_{11}$ 520 while statistics and copy are referenced to $t_{16}$ 545 as seen by the values for REORGLASTTIME, STATSLASTTIME, and COPYLASTTIME at time $t_{17}$ 550.

It is to be understood that the specific embodiments of the invention that have been described are merely illustrative of certain application of the principle of the present invention. Numerous modifications may be made to the real time statistics collection for self-managing a database system invention described herein without departing from the spirit and scope of the present invention.

What is claimed is:

1. A method for enabling management operations to be selectively run on a database object, comprising:
   wherein for each pair comprised of the database object and the management operations, maintaining a set of values that are indicative of whether the management operations are due on the database object;
   collecting indicators for all the management operations that are related to the object;
   asynchronously externalizing the collected indicators to ensure a minimal impact to other database functions;
   wherein the externalized indicators are real-time indicators that are stored for later near-real time identification of the object is an exception state that requires at least one of the management operations;
   updating an object count corresponding to the collected externalized indicators;
   based on the updated object count and the set of values for the pair corresponding to the database object, providing identification of the object, when the object is in the exception state; and
   automatically correcting the database object found in the exception state by the corresponding management operations.

2. The method of claim 1, wherein collecting the externalized indicators comprise collecting real-time statistics.

3. The method of claim 2, further comprising automatically reporting that the object requires the management operations.

4. The method of claim 2, further comprising automatically running the management operations on the object in the exception state.

5. The method of claim 1, further comprising dividing the database into tables.

6. The method of claim 5, wherein providing identification of the object comprises providing identification of the object at table granularity level.

7. The method of claim 5, further comprising dividing the tables into table partitions.

8. The method of claim 7, wherein providing identification of the object comprises providing identification of the object at table partition granularity level.

9. The method of claim 5, further comprising dividing the database into indexes.

10. The method of claim 1, further comprising dividing the database into indexes.

11. The method of claim 10, wherein providing identification of the object comprises providing identification of the object at index granularity level.

12. The method of claim 10, further comprising dividing the indexes into index partitions.

13. The method of claim 12, wherein providing identification of the object comprises providing identification of the object at index partition granularity level.

14. The method of claim 1, further comprising externalizing an incremental object count since a last maintenance operation.

15. The method of claim 14, further comprising resetting the incremental object count associated with a completed management operation.

16. The method of claim 1, wherein the object comprises an insert.

17. The method of claim 1, wherein the object comprises an update.

18. The method of claim 1, wherein the object comprises a delete.

19. The method of claim 1, further comprising recommending a management operation based on the identification of the object in the exception state.

20. The method of claim 19, wherein recommending the management operations comprise recommending a reorganization operation.

21. Method of claim 19, wherein recommending the management operations comprise recommending an update operation.

22. Method of claim 19, wherein recommending the management operations comprise recommending a copy operation.

23. A system for enabling management operations to be selectively run on a database object, comprising:
 means for maintaining a set of values that are indicative of whether the management operations are due on the database object for each pair comprised of the database object and the management operations;
 means for collecting indicators for all the management operations that are related to the object;
 means for asynchronously externalizing the collected indicators to ensure a minimal impact to other database functions;
 wherein the externalized indicators are real-time indicators that are stored for later near-real time identification of the object is an exception state that requires at least one of the management operations;
 means for updating an object count corresponding to the collected externalized indicators;
 means for providing identification of the object, based on the updated object count and the set of values for the pair corresponding to the database object, when the object is in the exception state; and
 means for automatically correcting the database object found in the exception state by the corresponding management operations.

24. A computer program product having executable instruction codes stored on a computer-useable medium, for enabling management operations to be selectively run on a database object, comprising:
 a set of instruction codes for maintaining a set of values that are indicative of whether the management operations are due on the database object, for each pair comprised of the database object and the management operations;
 a set of instruction codes for collecting indicators for all the management operations that are related to the object, including management operations that were not logged;
 a set of instruction codes for asynchronously externalizing the collected indicators to ensure a minimal impact to other database functions, wherein the externalized indicators are real-time indicators that are stored for later near-real time identification of the object is an exception state that requires at least one of the management operations;
 wherein for each pair comprised of the database object and the management operations, the first set of instruction codes maintaining a set of values that are indicative of whether the management operations is due on the database object;
 a set of instruction codes for updating an object count corresponding to the collected externalized indicators;
 based on the updated object count and the set of values for the pair corresponding to the database object, a set of instruction codes providing identification of the object, when the object is in the exception state; and
 the set of instruction codes further automatically correcting the database object found in the exception state by the corresponding management operations.

25. The computer program product of claim 24, wherein the externalized indicators comprise real-time statistics.

* * * * *